United States Patent
Pon et al.

(10) Patent No.: US 9,992,653 B2
(45) Date of Patent: Jun. 5, 2018

(54) E911 POSITIONING VIA BACKGROUND SIGNAL TRACKING

(71) Applicant: QUALCOMM Incorporated, San Diego, CA (US)

(72) Inventors: Rayman Wai Pon, Cupertino, CA (US); Dominic Gerard Farmer, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 14/848,135

(22) Filed: Sep. 8, 2015

(65) Prior Publication Data

US 2017/0070873 A1    Mar. 9, 2017

(51) Int. Cl.
*H04W 4/21* (2018.01)
*G01S 5/02* (2010.01)
*H04W 4/22* (2009.01)
*G01S 5/06* (2006.01)
*H04W 4/02* (2018.01)
*G01S 5/10* (2006.01)

(52) U.S. Cl.
CPC .............. *H04W 4/22* (2013.01); *G01S 5/0221* (2013.01); *G01S 5/0252* (2013.01); *G01S 5/06* (2013.01); *G01S 5/10* (2013.01); *H04W 4/021* (2013.01); *H04W 4/023* (2013.01); *H04W 4/90* (2018.02)

(58) Field of Classification Search
CPC ........ G01S 19/10; G01S 19/42; G01S 5/0257; G01S 19/02; G01S 5/009; G01S 5/14; H04W 64/00; H04W 4/02; H04W 4/025; H04W 4/021; H04W 52/0251; H04W 64/003; H04W 4/22; H04W 4/90; G06F 2221/2111; G08B 21/0211; G08B 21/028; G08B 21/0288; H04L 29/08657
See application file for complete search history.

(56) References Cited

U.S. PATENT DOCUMENTS

| 7,020,501 | B1* | 3/2006 | Elliott | H04W 52/0216 370/338 |
| 7,076,211 | B2* | 7/2006 | Donner | H04Q 9/00 340/506 |
| 2002/0012323 | A1* | 1/2002 | Petite | G01D 4/004 370/252 |

(Continued)

FOREIGN PATENT DOCUMENTS

| WO | WO 2010107356 A1 * | 9/2010 | ........ H04W 64/003 |
| WO | WO-2015053674 A1 | 4/2015 | |

OTHER PUBLICATIONS

Fischer S., "Observed Time Difference of Arrival (OTDOA) Positioning in 3GPP LTE", Jan. 1, 2014 (Jan. 1, 2014), 62 Pages, XP055284784, Retrieved from the Internet: URL: http://www.terranautx.com/s/Qualcomm-OTDOA-positioning-in-LTE-June-2014.pdf.

(Continued)

*Primary Examiner* — Nizar Sivji
(74) *Attorney, Agent, or Firm* — Berkeley Law & Technology Group LLP

(57) ABSTRACT

Example methods, apparatuses, or articles of manufacture are disclosed herein that may be utilized, in whole or in part, to facilitate or support one or more operations and/or techniques for improved E911 positioning via background signal tracking, such as for use in or with a mobile communication device, for example.

28 Claims, 4 Drawing Sheets

(56) References Cited

U.S. PATENT DOCUMENTS

| | | | |
|---|---|---|---|
| 2004/0061646 A1 | 4/2004 | Andrews et al. | |
| 2004/0078140 A1 | 4/2004 | Rowitch et al. | |
| 2010/0113061 A1* | 5/2010 | Holcman | G01S 19/34 455/456.1 |
| 2010/0331009 A1 | 12/2010 | Krishnamurthy et al. | |
| 2011/0176499 A1 | 7/2011 | Siomina et al. | |
| 2011/0275385 A1 | 11/2011 | Escolar-Piedras et al. | |
| 2013/0130710 A1 | 5/2013 | Boyer et al. | |
| 2013/0271324 A1* | 10/2013 | Sendonaris | G01S 5/02 342/450 |
| 2014/0075181 A1* | 3/2014 | Raghupathy | H04L 63/0442 713/150 |
| 2014/0266905 A1* | 9/2014 | Sendonaris | G01S 1/02 342/385 |
| 2014/0295881 A1* | 10/2014 | Werner | H04W 4/023 455/456.1 |
| 2015/0024787 A1* | 1/2015 | Ben-Itzhak | H04L 12/18 455/456.4 |
| 2015/0071440 A1* | 3/2015 | Raghupathy | G06F 21/6245 380/258 |
| 2015/0119066 A1 | 4/2015 | Chiou et al. | |
| 2015/0188671 A1* | 7/2015 | Distasi | H04L 1/189 370/336 |
| 2015/0237565 A1* | 8/2015 | Opshaug | H04W 40/246 370/329 |
| 2016/0295388 A1* | 10/2016 | Vasic | G08B 25/001 |

OTHER PUBLICATIONS

International Search Report and Written Opinion—PCT/US2016/049579—ISA/EPO—dated Nov. 8, 2016.

* cited by examiner

E911 POSITIONING VIA BACKGROUND SIGNAL TRACKING

BACKGROUND

1. Field

The present disclosure relates generally to position or location estimations of mobile communication devices and, more particularly, to improved E911 positioning via background signal tracking for use in or with mobile communication devices.

2. Information

Mobile communication devices, such as, for example, cellular telephones, portable navigation units, laptop computers, personal digital assistants, or the like are becoming more common every day. Certain mobile communication devices, such as, for example, location-aware cellular telephones, smart telephones, or the like may assist users in estimating their geographic locations by providing positioning assistance parameters obtained or gathered from various systems. For example, in an outdoor environment, certain mobile communication devices may obtain an estimate of their geographic location or so-called "position fix" by acquiring wireless signals from a satellite positioning system (SPS), such as the global positioning system (GPS) or other like Global Navigation Satellite Systems (GNSS), cellular base station, etc. via a cellular telephone or other wireless or electronic communications network. Acquired wireless signals may, for example, be processed by or at a mobile communication device, and its location may be estimated using known techniques, such as Advanced Forward Link Trilateration (AFLT), base station identification, cell tower triangulation, or the like.

In an indoor or like environment, such as urban canyons, for example, mobile communication devices may be unable to reliably receive or acquire satellite or like wireless signals to facilitate or support one or more position estimation techniques. For example, signals from an SPS or other wireless transmitters may be attenuated or otherwise affected in some manner (e.g., insufficient, weak, fragmentary, etc.), which may at least partially preclude their use for position estimations. At times, a mobile communication device may obtain a position fix by measuring ranges to three or more terrestrial wireless transmitter devices, such as cellular base stations, access points, etc. positioned at known locations. Ranges may be measured, for example, by obtaining a Media Access Control identifier (MAC ID) address from wireless signals received from suitable access points and measuring one or more characteristics of received signals, such as signal strength, round trip delay, or the like.

In some instances, a position fix of a mobile communication device may be obtained in connection with an observed time difference of arrival (OTDOA) technique. In this technique, a mobile communication device may measure timing differences between reference signals received from two or more pairs of cellular base stations, for example, and may obtain a position fix based, at least in part, on known locations and transmission timing for the measured base stations. An OTDOA positioning technique may, for example, be employed to assist in localization of a mobile communication device in the event of an emergency call, such as in compliance with Emergency 911 (E911) mandates from the Federal Communication Commission (FCC). At times, however, OTDOA positioning accuracy may be affected, at least in part, by receiver sensitivity or hearability issues, such as if wireless signals of OTDOA requests acquired from proximate cellular base stations have low or insufficient power, such as to facilitate or support appropriate measurements (e.g., reference signal time differences, etc.), for example. In some instances, OTDOA positioning accuracy may also be affected, at least in part, by signal multipath or scattering effects, for example, which may introduce errors to observed arrival times of OTDOA reference signals. E911 OTDOA positioning may also rely or, at times, be dependent on a dedicated positioning architecture, such as having a dedicated location server, for example, to manage OTDOA positioning by providing assistance data (e.g., OTDOA requests, reference signals, etc.) to mobile communication devices and computing a location estimate.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
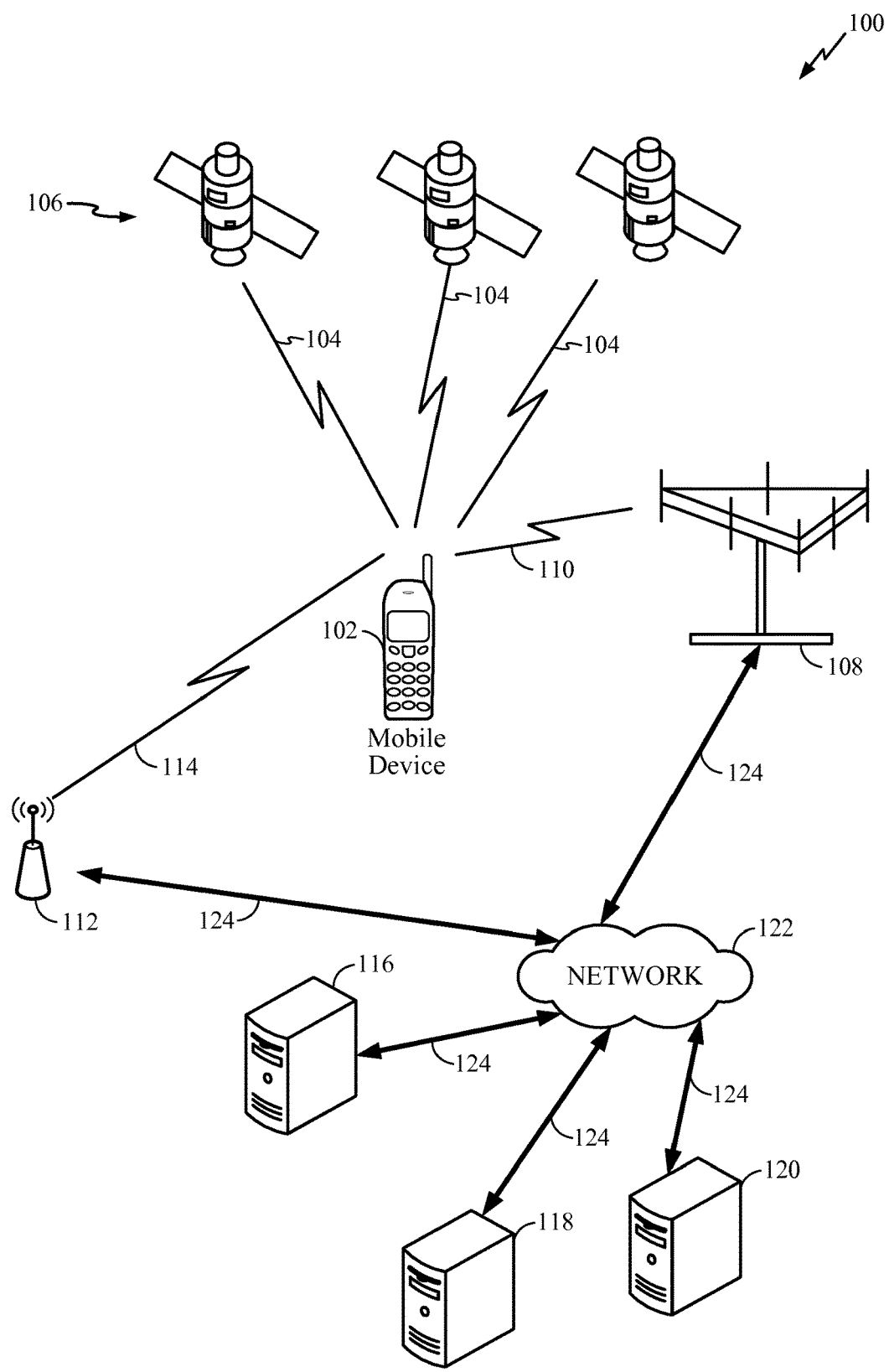
FIG. 1 is a schematic diagram illustrating features associated with an implementation of an example operating environment.

Example implementations relate to techniques for improved E911 positioning via background signal tracking. In one implementation, a method may comprise obtaining one or more observations of one or more terrestrial signals; storing the one or more observations in a local memory; retrieving, in response to an emergency event, the one or more stored observations for use, at least in part, in acquisition of one or more reference signals; and determining a position fix of a mobile device based, at least in part, on the one or more stored observations.

In another implementation, an apparatus may comprise means for obtaining one or more observations of one or more terrestrial signals; means for storing the one or more observations in a local memory; means for retrieving, in response to an emergency event, the one or more stored observations for use, at least in part, in acquisition of one or more reference signals; and means for determining a position fix of a mobile device based, at least in part, on the one or more stored observations.

In yet another implementation, an apparatus may comprise a wireless transceiver to communicate with an electronic communications network, the wireless transceiver configured to obtain one or more observations of one or more terrestrial signals; and one or more processors coupled to a memory and to the wireless transceiver, the one or more processors configured to store the one or more observations in a local memory; retrieve, in response to an emergency event, the one or more stored observations for use, at least in part, in acquisition of one or more reference signals; and determine a position fix of a mobile device based, at least in part, on the one or more stored observations.

In yet another implementation, an article may comprise a non-transitory storage medium having instructions executable by a processor to obtain one or more observations of one or more terrestrial signals; store the one or more observations in a local memory; retrieve, in response to an emergency event, the one or more stored observations for use, at least in part, in acquisition of one or more reference signals; and determine a position fix of a mobile device based, at least in part, on the one or more stored observations. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be implemented, in whole or in part, to facilitate or support one or more operations and/or techniques for improved E911 positioning via background signal tracking for use in or with mobile communication devices. As will be seen, depending on an implementation, background signal tracking may include tracking positioning reference signals (PRS) and/or cell-specific reference signals (CRS) signals for OTDOA in 4G Long Term Evolution (LTE) communications networks, 1× signals for AFLT in Code Division Multiple Access (CDMA) communications networks, satellite positioning system (SPS) signals, or the like. As used herein, "mobile device," "mobile communication device," "location-aware mobile device," or like terms may be used interchangeably and may refer to any kind of special purpose computing platform or apparatus that may from time to time have a position or location that changes. In some instances, a mobile communication device may, for example, be capable of communicating with other devices, mobile or otherwise, through wireless transmission or receipt of information according to one or more communication protocols. As a way of illustration, special purpose mobile communication devices, which may herein be called simply mobile devices, may include, for example, cellular telephones, smart telephones, personal digital assistants (PDAs), laptop computers, personal entertainment systems, tablet personal computers (PC), personal audio or video devices, personal navigation devices, radio heat map generation tools, or the like. It should be appreciated, however, that these are merely examples of mobile devices that may be used, at least in part, to implement one or more operations and/or techniques for improved E911 positioning via background signal tracking, and that claimed subject matter is not limited in this regard. It should also be noted that the terms "position" and "location" may be used interchangeably herein.

As alluded to previously, a position fix of a mobile device, such as a cellular telephone, for example, may be obtained based, at least in part, on information gathered from various systems. One such system may comprise, for example, an OTDOA positioning system. In this system, a dedicated location server may manage OTDOA positioning for a mobile device by providing OTDOA positioning assistance data, such as reference cell data and/or neighbor cell data, for example, and computing and/or verifying a position fix using one or more reference signal time difference (RSTD) measurements obtained from the mobile device. An OTDOA positioning in LTE, such as described in documents from a consortium named "3rd Generation Partnership Project" ("3GPP"), for example, is generally known and need not be described here in greater detail. In some instances, such as if positioning via acquisition of signals transmitted from a global navigation satellite system (GNSS) is not available, for example, use of OTDOA for obtaining a position fix may provide a more accurate position fix than a position fix via a Cell-ID and/or Enhanced Cell-ID detection alone.

In some instances, an OTDOA system may support one or more emergency services, such as E911 emergency services, for example, dispatching an appropriate first responder (e.g., fire, police, ambulance, etc.) to a location of a mobile device in response to a 911 emergency call originating from the device. Thus, in response to an emergency 911 call to a Public Safety Answering Point (PSAP), for example, the PSAP may initiate operations for determining an estimated location of an emergency caller for dispatch of a public safety service. Here, a mobile device may, for example, receive from an OTDOA location server a message comprising an OTDOA request, positioning assistance data, etc. in response to a detection of an emergency event at a PSAP. In response to this message, a mobile device may, for example, initiate an E911 OTDOA positioning session, such as obtain one or more observations and transmit these observations to a location server for computation of a position fix using one or more appropriate techniques (e.g., trilateration, etc.). In this context, "observation" refers to a measured attribute or characteristic of a wireless signal transmitted by a wireless transmitter and acquired by an observing receiver or other sensor co-located with a mobile device. In some instances, one or more observations may include, for example, one or more measurements of times of arrival (TOAs) or time differences of arrival (TDOAs) of PRS and/or CRS transmitted by proximate cellular base stations and acquired at a receiver of a mobile device, though claimed subject is not so limited. For example, at times, one or more observations may comprise, for example, one or more TOAs of CDMA pilot measurements in AFLT. Having computed a position fix, a location server may, for example, communicate the fix to an appropriate PSAP, such as for dispatching an appropriate first responder, as was indicated.

At times, during an OTDOA positioning session, however, such as initiated in response to receiving a message indicating an E911 emergency event, for example, all current activity for obtaining a position fix (e.g., acquisition of GNSS signals, etc.) may be ceased or stopped. Since current activity for obtaining a position fix may cease, in some instances, a mobile device may not be able to take additional advantage of one or more observations obtained prior to an E911 OTDOA positioning session in obtaining current observations, such as, for example, for faster and/or more accurate computation of a position fix. For example, as will be seen, one or more observations obtained prior to an E911 OTDOA positioning session may help with detecting expected multipath and/or shadow-fading conditions, if present, may improve receiver sensitivity, such as via narrowing search windows by focusing on a particular search range and/or area, or the like. In addition, utilizing observations obtained prior to and/or independently from parameters provided in an E911 message, for example, may reduce reliance on a dedicated OTDOA positioning system and/or location server, improve air interface scalability and/or compatibility, or the like. Also, with introductions of newer services, such as Voice over LTE (VoLTE), for example, emergency services may soon be migrating to an LTE air interface, as one possible solution, and, as such, legacy interfaces (e.g., 3G, etc.) may no longer be employed or supported. Accordingly, it may be desirable to develop one or more methods, systems, or apparatuses that may implement improved E911 positioning, such as via taking advantage of history of observations obtained prior to an/or independently of an E911 OTDOA positioning session, for example.

Thus, as will be discussed in greater detail below, in an implementation, instead of starting anew to search for PRS and/or CRS signals, such as in accordance with an OTDOA session in response to an emergency event with only parameters in an E911 message, for example, a mobile device may employ one or more prior observations of these signals (e.g., TOA, TDOA, etc. measurements, etc.) stored in a local memory. For example, since a mobile device is typically making wireless wide area network (WWAN) or like measurements of signals transmitted by serving cells and/or neighbor cells (e.g., via background processes), there may be no or little incremental power to store applicable observations. As such, once an E911 OTDOA position session is started, stored observations may be accessed or retrieved, such as by a suitable process running on a mobile device, for example, and may be used, at least in part, to facilitate or support searching or acquiring applicable signals in the E911 session, as will also be seen. It should be noted that even though the discussion references PRS and/or CRS signals in LTE, such as for ease of description, any other suitable signals and/or communication networks, such as 1× signals for AFLT in CDMA, GNSS signals, etc. may also be utilized herein, in whole or in part, such as in a similar or like fashion.

FIG. 1 is a schematic diagram illustrating features associated with an implementation of an example operating environment 100 capable of facilitating or supporting one or more processes or operations for improved E911 positioning via background signal tracking for use in or with a mobile device, such as a location-aware mobile device 102, for example. It should be appreciated that operating environment 100 is described herein as a non-limiting example that may be implemented, in whole or in part, in the context of various electronic communications networks or combination of such networks, such as public networks (e.g., the Internet, the World Wide Web), private networks (e.g., intranets), WWAN, wireless local area networks (WLAN, etc.), or the like. It should also be noted that claimed subject matter is not limited to indoor implementations. For example, at times, one or more operations or techniques described herein may be performed, at least in part, in an indoor-like environment, which may include partially or substantially enclosed areas, such as urban canyons, town squares, amphitheaters, parking garages, rooftop gardens, patios, or the like. At times, one or more operations or techniques described herein may be performed, at least in part, in an outdoor environment.

As illustrated, in an implementation, mobile device 102 may, for example, receive or acquire satellite positioning system (SPS) signals 104 from SPS satellites 106. In some instances, SPS satellites 106 may be from a single global navigation satellite system (GNSS), such as the GPS or Galileo satellite systems, for example. In other instances, SPS satellites 106 may be from multiple GNSS such as, but not limited to, GPS, Galileo, Glonass, or Beidou (Compass) satellite systems. In certain implementations, SPS satellites 106 may be from any one several regional navigation satellite systems (RNSS) such as, for example, WAAS, EGNOS, QZSS, just to name a few examples.

At times, mobile device 102 may, for example, transmit wireless signals to, or receive wireless signals from, a suitable wireless communication network. In one example, mobile device 102 may communicate with a cellular communication network, such as by transmitting wireless signals to, or receiving wireless signals from, a base station transceiver 108 over a wireless communication link 110, for example. Similarly, mobile device 102 may transmit wireless signals to, or receive wireless signals from a local transceiver 112 over a wireless communication link 114. Base station transceiver 108, local transceiver 112, etc. may be of the same or similar type, for example, or may represent different types of devices, such as access points, radio beacons, cellular base stations, femtocells, or the like, depending on an implementation. In some instances, local transceiver 112 may comprise, for example, a wireless transmitter or receiver capable of transmitting or receiving wireless signals. For example, as will be seen, at times, wireless transceiver 112 may be capable of obtaining one or more observations from one or more other terrestrial transmitters.

In a particular implementation, local transceiver 112 may be capable of communicating with mobile device 102 at a shorter range over wireless communication link 114 than at a range established via base station transceiver 108 over wireless communication link 110. For example, local transceiver 112 may be positioned in an indoor or like environment and may provide access to a wireless local area network (WLAN, e.g., IEEE Std. 802.11 network, etc.) or wireless personal area network (WPAN, e.g., Bluetooth® network, etc.). In another example implementation, local transceiver 112 may comprise a femtocell or picocell capable of facilitating communication via link 114 according to an applicable cellular or like wireless communication protocol. Of course, it should be understood that these are merely examples of networks that may communicate with mobile device 102 over a wireless link, and claimed subject matter is not limited in this respect. For example, in some instances, operating environment 100 may include a larger number of base station transceivers 108, local transceivers 112, etc.

In an implementation, base station transceiver 108, local transceiver 112, etc. may communicate with servers 116, 118, or 120 over a network 122 via one or more links 124. Network 122 may comprise, for example, any combination of wired or wireless communication links. In a particular implementation, network 122 may comprise, for example, Internet Protocol (IP)-type infrastructure capable of facilitating or supporting communication between mobile device 102 and one or more servers 116, 118, 120, etc. via local transceiver 112, base station transceiver 108, etc. In another implementation, network 122 may comprise, for example cellular communication network infrastructure, such as a base station controller or master switching center to facilitate or support mobile cellular communication with mobile device 102. As was indicated, in some instances, network 122 may facilitate or support communications with a PSAP or like entity, such as for purposes of initiating and/or implementing an E911 OTDOA positioning session, for example. Servers 116, 118, and/or 120 may comprise any suitable servers or combination thereof capable of facilitating or supporting one or more operations or techniques discussed herein. For example, servers 116, 118, or 120 may comprise one or more location servers (e.g., Evolved Serving Mobile Location Server (E-SMLC), Secure User Plane Location Server/SUPL Location Platform (SUPL SLP), etc.), positioning assistance servers, navigation servers, map servers, crowdsourcing servers, network-related servers, or the like.

In particular implementations, and as also discussed below, mobile device 102 may have circuitry or processing resources capable of determining a position fix or estimated location of mobile device 102, initial or otherwise. For example, if satellite signals 104 are available, mobile device 102 may compute a position fix based, at least in part, on pseudorange measurements to four or more SPS satellites 106. Here, mobile device 102 may compute such pseudorange measurements based, at least in part, on pseudonoise code phase detections in signals 104 acquired from four or more SPS satellites 106. In particular implementations, mobile device 102 may receive from one or more servers 116, 118, or 120 positioning assistance data to aid in the acquisition of signals 104 transmitted by SPS satellites 106 including, for example, almanac, ephemeris data, Doppler search windows, just to name a few examples.

In some implementations, mobile device 102 may obtain a position fix by processing wireless signals received from one or more terrestrial transmitters positioned at known locations (e.g., base station transceiver 108, local transceiver 112, etc.) using any one of several techniques, such as, for example, OTDOA, AFLT, or the like. In these techniques, a range from mobile device 102 may, for example, be measured to three or more of terrestrial transmitters based, at least in part, on one or more reference signals (e.g., PRS, CRS, etc.) transmitted by these transmitters and received at mobile device 102, as was indicated. Here, servers 116, 118, or 120 may be capable of providing positioning assistance data to mobile device 102 including, for example, OTDOA reference cell data, OTDOA, neighbor cell data, PRC and/or CRS configuration data, RSTD search window, locations, identities, orientations, etc. of terrestrial transmitters to facilitate one or more applicable positioning techniques (e.g., AFLT, OTDOA, etc.). At times, servers 116, 118, or 120 may include, for example, a base station almanac (BSA) indicating locations, identities, orientations, etc. of cellular base stations (e.g., base station transceiver 108, local transceiver 112, etc.) in one or more particular areas or regions associated with operating environment 100.

As alluded to previously, in particular environments, such as indoor or like environments (e.g., urban canyons, etc.), mobile device 102 may not be capable of acquiring or processing signals 104 from a sufficient number of SPS satellites 106 so as to perform a suitable positioning technique. Thus, optionally or alternatively, mobile device 102 may be capable of determining a position fix based, at least in part, on signals acquired from one or more local transmitters, such as femtocells, Wi-Fi access points, or the like. For example, mobile device 102 may obtain a position fix by measuring ranges to three or more local transceivers 112 positioned at known locations. In some implementations, mobile device 102 may, for example, measure ranges by obtaining a MAC address from local transceiver 112, as was indicated.

In an implementation, mobile device 102 may, for example, receive positioning assistance data for one or more positioning operations from servers 116, 118, and/or 120. At times, positioning assistance data may include, for example, locations, identities, orientations, etc. of one or more local transceivers 112, base station transceivers 108, etc. positioned at known locations for measuring ranges to these transmitters based, at least in part, on an RTT, TOA, TDOA, etc., or any combination thereof. In some instances, positioning assistance data to aid indoor positioning operations may include, for example, radio heat maps, context parameter maps, routeability graphs, etc., just to name a few examples. Other assistance data received by mobile device 102 may include, for example, electronic digital maps of indoor or like areas for display or to aid in navigation. A map may be provided to mobile device 102 as it enters a particular area, for example, and may show applicable features such as doors, hallways, entry ways, walls, etc., points of interest, such as bathrooms, pay phones, room names, stores, or the like. By obtaining a digital map of an indoor or like area of interest, mobile device 102 may, for example, be capable of overlaying its current location over the displayed map of the area so as to provide an associated user with additional context, frame of reference, or the like. The terms "positioning assistance data" and "navigation assistance data" may be used interchangeably herein.

According to an implementation, mobile device 102 may access indoor navigation assistance data via servers 116, 118, or 120 by, for example, requesting such data through selection of a universal resource locator (URL). In particular implementations, servers 116, 118, or 120 may be capable of providing indoor navigation assistance data to cover many different indoor areas including, for example, floors of buildings, wings of hospitals, terminals at an airport, portions of a university campus, areas of a large shopping mall, just to name a few examples. Also, if memory or data transmission resources at mobile device 102 make receipt of indoor positioning assistance data for all areas served by servers 116, 118, or 120 impractical or infeasible, a request for such data from mobile device 102 may, for example, indicate a rough or course estimate of a location of mobile device 102. Mobile device 102 may then be provided indoor navigation assistance data covering, for example, one or more areas including or proximate to a roughly estimated location of mobile device 102. In some instances, one or more servers 116, 118, or 120 may facilitate or support obtaining one or more observations, such as stored in a local memory of mobile device 102 via one or more background processes, RSTD or like measurements, such as for determining a position fix in connection with an E911 OTDOA positioning session, for example, and may provide the position fix to an applicable PSAP via network 122.

Even though a certain number of computing platforms and/or devices are illustrated herein, any number of suitable computing platforms and/or devices may be implemented to facilitate or support one or more techniques or processes associated with operating environment 100. For example, at times, network 122 may be coupled to one or more wired or wireless communication networks (e.g., WLAN, etc.) so as to enhance a coverage area for communications with mobile device 102, one or more base station transceivers 108, local transceiver 112, servers 116, 118, 120, or the like. In some instances, network 122 may facilitate or support femtocell-based operative regions of coverage, for example. Again, these are merely example implementations, and claimed subject matter is not limited in this regard.

Figure 2:
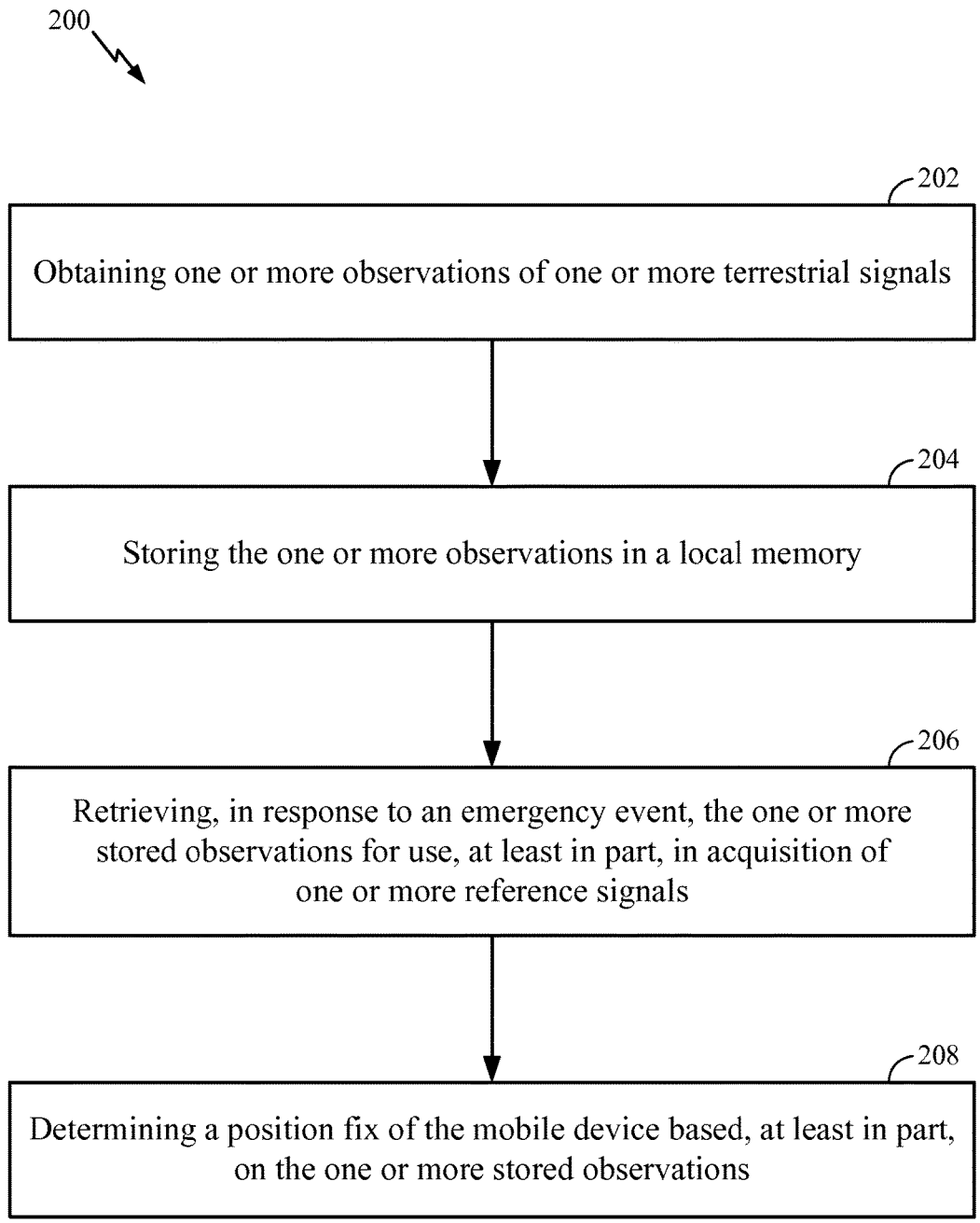
FIG. 2 is a flow diagram illustrating an implementation of an example process that may be performed to facilitate and/or support improved E911 positioning via background signal tracking.

With this in mind, attention is now drawn to FIG. 2, which is a flow diagram illustrating an implementation of an example process 200 that may be performed, in whole or in part, to facilitate or support one or more operations or techniques for improved E911 positioning via background signal tracking for use in or with a location-aware mobile device, such as mobile device 102 of FIG. 1, for example. It should be noted that information acquired or produced, such as, for example, input signals, output signals, operations, results, etc. associated with example process 200 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

Example process 200 may, for example, begin at operation 202 with obtaining one or more observations of one or more terrestrial signals. As was indicated, while traveling within an area or region of interest, a mobile device may observe, such as receive and/or acquire, for example, terrestrial wireless signals from one or more proximate or "visible" wireless transmitters, such as one or more serving and/or neighbor cellular base stations, WLAN access points, Bluetooth® beacons, etc., or any combination thereof. A mobile device may, for example, decode particular parameters or attributes encoded in the acquired signals using one or more appropriate techniques. In some instances, parameters or attributes may comprise, for example, identities (e.g., Cell IDs, MAC addresses, etc.) of observed wireless transmitters as well as received signal strength, round trip time, or like characteristics or aspects of acquired wireless signals.

In at least one implementation, one or more observations may comprise, for example, one or more TOA or TDOA measurements of PRS and/or CRS signals, such as transmitted by one or more proximate cellular base stations. Typically, PRS and/or CRS may, for example, be implemented, if appropriate or useful, to increase or improve "hearability" or detectability of a sufficient number of geographically dispersed cellular base stations. PRS and/or CRS may, for example, be transmitted periodically, such as in pre-defined positioning subframes grouped by several consecutive subframes or so-called "positioning occasions." Positioning occasions of PRS and CRS may differ, however, meaning that CRS may have higher instances of periodicity, which may affect, at least in part, in some manner power consumption of a mobile device, such as via a continual acquisition (e.g., every millisecond, etc.) and/or processing of respective observations. Thus, in some instances, utilizing PRS, such as to facilitate or support one or more operations or techniques discussed herein may be more desirable and/or useful, such as in relation to CRS, for example. However, it should be noted that claimed subject matter is not limited to particular signals and/or implementations, meaning that any suitable signals, such as CRS, 1× signals for AFLT in CDMA, satellite signals, such as received and/or acquired in connection with an Assisted GPS (A-GPS) system, for example, or the like may be used herein, at least in part, or otherwise considered.

With regard to operation 204, one or more observations may, for example, be stored in a local memory. For example, one or more observations, such as discussed above, may be collected and/or stored, such as one or more digital signals via a suitable host application or process, such as a background process, as one possible implementation, dedicated or otherwise. A host application or like process may, for example, be provided to a user's mobile device by a suitable server, stored locally on a mobile device, etc. An application or process may, for example, be activated, launched, downloaded, etc. upon user's turning on, rebooting, or activating a mobile device, entering an area or region of interest, upon request, user input, or the like. As was indicated, since, while in operative use, a mobile device is typically making WWAN measurements of terrestrial signals transmitted by one or more proximate wireless transmitters, such as one or more serving cellular base stations and/or neighbor cellular base stations, for example, one or more observations may be stored in a local memory with no or little incremental power.

At operation 206, in response to an emergency event, the one or more stored observations may, for example, be retrieved for use, at least in part, in acquisition of one or more reference signals. In some instances, an emergency event may, for example, be detected via a message indicative of an emergency event and received at a mobile device, just to illustrate one possible implementation. A message indicative of an emergency event may comprise, for example, an LTE positioning protocol (LPP/LPPe) message communicated via an appropriate transport channel in response to a detection of an emergency event at a PSAP, such as an emergency 911 call placed from a mobile device, as discussed above. At times, a message indicative of an emergency event may follow a capability exchange or like communication between an OTDOA location server and a mobile device, such as a request capabilities-type message and response, for example. As was also indicated, having received a message indicative of an emergency event, a mobile device may, for example, initiate an E911 OTDOA positioning session, at which point all current activity for obtaining a position fix (e.g., acquisition of GNSS signals, etc.) may be ceased. Thus, here, to take additional advantage of one or more observations obtained prior to ceasing all current positioning activity (e.g., prior to an E911 OTDOA positioning session) in obtaining current observations of a PRS and/or CRS, a mobile device may, for example, make use of a history of one or more prior PRS and/or CRS observations stored in local memory.

More specifically, in an implementation, in response to initiation of an E911 OTDOA positioning session, a mobile device may access its local memory, for example, and may retrieve one or more stored TOA or TDOA measurements of one or more previously observed PRS and/or CRS signals, whichever is appropriate or applicable. A mobile device may also acquire or receive GNSS positioning assistance data, if available (e.g., if not located in a GNSS-denied environment, such as indoors, etc.), and/or OTDOA positioning assistance data with a request to obtain current RSTD measurements from proximate cellular base stations (e.g., reference, neighbor, etc.), such as in accordance with an E911 OTDOA positioning procedure, for example. As was indicated, positioning assistance data may comprise, for example, parameters useful for acquisition of GNSS signals, if available, and/or PRS and/or CRS signals (e.g., candidate cellular base stations, PRS and/or CRS configuration, desired accuracy, response time, channels, ephemeris, frequency windows, etc.).

Thus, in some instances, instead of performing RSTD measurements, such as using provided positioning assistance data, for example, which may waste time and/or resources, a mobile device may communicate one or more retrieved recent TOA or TDOA measurements to a location server, such as for faster computation of a position fix. At times, a position fix may be computed at or by a mobile device, such as using one or more retrieved recent TOA or TDOA measurements, for example, and may be provided to a location or other suitable server via an appropriate message. This may also be useful if a PRS and/or CRS signal is attenuated or blocked, such as upon or after initiation of an R911 OTDOA positioning session, for example.

In a particular implementation, a mobile device may use one or more retrieved observations to define or characterize an associated wireless environment, such as, for example, for more accurate or error-free acquisition of current PRS and/or CRS signals. For example, using a history of observations, a mobile device may be capable of making determinations regarding expected multipath and/or shadow-fading conditions and/or distinguishing between true and biased TOA or TDOA measurements. Namely, if a mobile device is tracking an applicable signal continually, the mobile device may have a better chance to lock onto or detect a true Early Arrival Path (EAP) with true TOA or TDOA measurements despite user motion over a measurement period and/or may be able to detect or determine a non-line-of sight or like path with biased TOA or TDOA measurements using one or more previous EAP-related TOA or TDOA measurements.

In another implementation, one or more observations obtained prior to an E911 OTDOA positioning session may improve receiver sensitivity, such as via narrowing search windows by focusing on a particular search range and/or area, for example. Here, if a PRS and/or CRS is temporarily lost, such as prior to initiation of OTDOA in an E911 positioning session, for example, one or more stored observations of the PRS and/or CRS may provide a mobile device with some notion of where such a signal may be found (e.g., since the signal was tracked recently and/or previously, etc.), such as by reducing a search range, focusing on a specific candidate, etc. In some instances, this may, for example, lower search uncertainty, such as by narrowing the size of a search window of an expected RSTD or other uncertainty parameter provided by a location server in a message indicative of an emergency event, as one possible example. As a result, one or more reference signals may, for example, be acquired more effectively and/or more efficiently, which may improve power and/or resource consumption, or the like.

At operation 208, a position fix of the mobile device may, for example, be computed based, at least in part, on the one or more stored observations. As was indicated, a position fix of a mobile device may, for example, be computed in connection with an observed time difference of arrival (OTDOA) technique in which the mobile device may employ one or more stored TOA or TDOA-related observations previously received from two or more pairs of cellular base stations. Thus, using the stored observations, a mobile device may, for example, obtain a position fix based, at least in part, on known locations and transmission timing for the measured base stations, just to illustrate one possible implementation. A computed position fix may, for example, be provided to a location or other suitable server via an appropriate message. This may be useful if a PRS and/or CRS signal is attenuated or blocked, such as upon or after initiation of an R911 OTDOA positioning session, for example, as was also indicated.

At times, a mobile device may, for example, be capable of utilizing one or more on-board sensors to augment in some manner one or more observations, such as for more effective and/or more efficient obtaining and/or communicating a position fix. For example, an accelerometer or like inertial sensor disposed on a mobile device may be used, at least in part, to estimate a location of a mobile device via dead reckoning, just to illustrate one possible implementation. Here, an accelerometer may, for example, approximate a current location of a mobile device based, at least in part, on a last known TOA or TDOA-related position fix, and incrementing that position fix using a known direction of travel and/or estimated speed over some elapsed time. Thus, as a way of illustration, if a TOA or TDOA-related position fix is obtained every 10.0 seconds, for example, an accelerometer or like inertial sensor may augment one or more observations by providing a number of additional location estimates during this 10-second period, which may shorten position verification times. It should be noted that one or more observations may be augmented prior to their storage, for example, and/or after their retrieval, such as from local memory. Of course, these are merely details relating to augmenting one or more observations with sensor data, and claimed subject matter is not so limited. Also, claimed subject matter is not limited to an accelerometer or like sensor. Any other suitable sensor or combination of sensors associated with a mobile device may be utilized, at least in part, to augment one or more observations with sensor data in a similar fashion.

In some instances, one or more stored observations of a PRS and/or CRS may enable a mobile device to extend benefits of continuous measurements, such as via filtering of successive measurements to reduce noise, for example, from observations obtained prior to initiation of an E911 OTDOA positioning session to one or more PRS and/or CRS observations obtained after initiation of an E911 OTDOA positioning session. For example, if a mobile device has capability and/or notion of LTE Doppler, which typically, although not necessarily, has greater accuracy than TOA or TDOA, then successive measurements may be filtered or smoothed, at least in part, by weighting a Doppler propagated signal from previously obtained measurements, such as to the current epoch, for example, along with the current TOA or TDOA estimate itself. Thus, at times, weighing a Doppler propagated signal may yield less noisy estimates of a current TOA or TDOA measurement, for example. In some instances, it may be useful to weigh a current Doppler propagated signal since Doppler propagation may typically provide a change (e.g., delta) of applicable measurement values, for example, while TOA or TDOA may provide absolute measurement values. As such, in some instances, it may be useful to limit utilization of such deltas in an appropriate manner, which may be determined experimentally and/or dynamically (e.g., pre-defined, etc.), for example. In addition, utilization of observations obtained prior to and/or independently from parameters provided in an E911 message, for example, may reduce reliance on a dedicated OTDOA positioning system and/or location server, improve air interface scalability and/or compatibility, or the like, as was indicated.

Again, even though the discussion herein is provided in terms of PRS and/or CRS signals, such as for ease of description, any other suitable signals and/or communication networks, such as 1× signals for AFLT in CDMA, GNSS signals, etc. may also be utilized, in whole or in part, to facilitate or support one or more operations and/or techniques for improved E911 positioning via background signal tracking, such as in a similar or like fashion. For example, although background GNSS signal tracking may consume a relatively larger amount of power and/or processing resources, it may nevertheless be implemented without deviating from the scope of claimed subject matter. Thus, in some instances, such as in an outdoor or like open sky-type environments, for example, energy-efficient duty cycling techniques of newer GNSS chip architectures may be capable of keeping GNSS processes fresh (e.g., via an always-on positioning application running in the background without assistance from other application(s), etc.) at an ultra low average power, such as for a continual tracking of GNSS signals.

Figure 3:
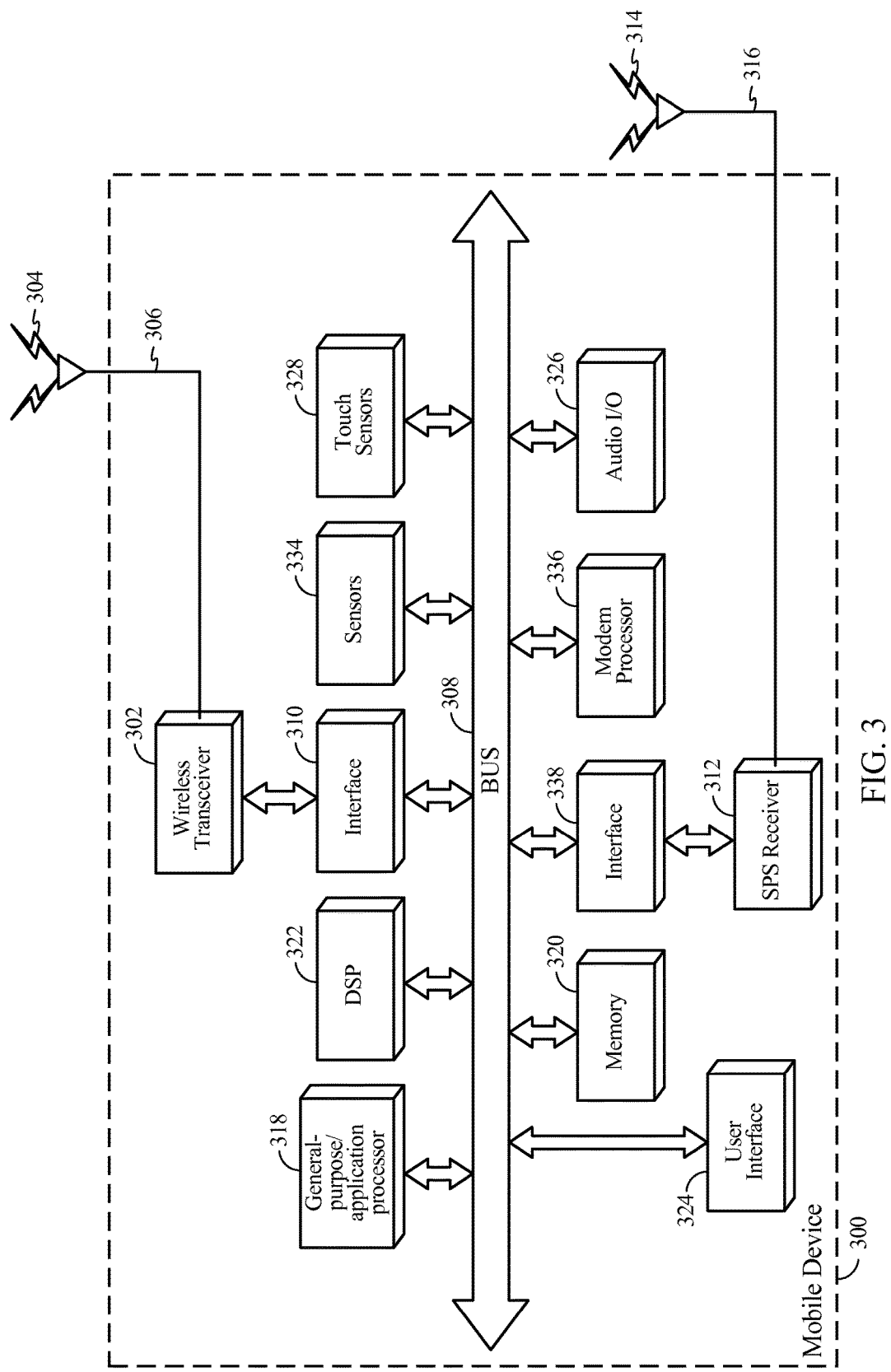
FIG. 3 is a schematic diagram illustrating an implementation of an example computing environment associated with a mobile device.

FIG. 3 is a schematic diagram of an implementation of an example computing environment associated with a mobile device that may be used, at least in part, to facilitate or support one or more operations and/or techniques for improved E911 positioning via background signal tracking. An example computing environment may comprise, for example, a mobile device 300 that may include one or more features or aspects of mobile device 102 of FIG. 1, though claimed subject matter is not so limited. For example, in some instances, mobile device 300 may comprise a wireless transceiver 302 capable of transmitting and/or receiving wireless signals, referenced generally at 304, such as via an antenna 306 over a suitable wireless communications network. Wireless transceiver 302 may, for example, be capable of sending or receiving one or more suitable communications, such as one or more communications discussed with reference to FIGS. 1 and 2. Wireless transceiver 302 may, for example, be coupled or connected to a bus 308 via a wireless transceiver bus interface 310. Depending on an implementation, at times, wireless transceiver bus interface 310 may, for example, be at least partially integrated with wireless transceiver 302. Some implementations may include multiple wireless transceivers 302 or antennas 306 so as to enable transmitting or receiving signals according to a corresponding multiple wireless communication standards such as WLAN or WiFi, Code Division Multiple Access (CDMA), Wideband-CDMA (W-CDMA), Long Term Evolution (LTE), Bluetooth®, just to name a few examples.

In an implementation, mobile device 300 may, for example, comprise an SPS or like receiver 312 capable of receiving or acquiring one or more SPS or other suitable wireless signals 314, such as via an SPS or like antenna 316. SPS receiver 312 may process, in whole or in part, one or more acquired SPS signals 314 for estimating a location of mobile device 300, initial or otherwise. In some instances, one or more general-purpose/application processors 318 (henceforth referred to as "processor"), memory 320, digital signal processor(s) (DSP) 322, or like specialized devices or processors not shown may be utilized to process acquired SPS signals 314, in whole or in part, calculate a location of mobile device 300, such as in conjunction with SPS receiver 312, or the like. Storage of SPS or other signals for implementing one or more positioning operations, such as in connection with one or more techniques for improved E911 positioning via background signal tracking, for example, may be performed, at least in part, in memory 320, suitable registers or buffers (not shown). Although not shown, it should be appreciated that in at least one implementation one or more processors 318, memory 320, DSPs 322, or like specialized devices or processors may comprise one or more processing modules capable of obtaining one or more observations of one or more terrestrial signals; storing the one or more observations in a local memory; retrieving, in response to an emergency event, the one or more stored observations for use, at least in part, in acquisition of one or more reference signals; and determining a position fix of mobile device 300 based, at least in part, on the one or more stored observations.

It should be noted that all or part of one or more processing modules may be implemented using or otherwise including hardware, firmware, software, or any combination thereof. Processing modules may be representative of one or more circuits capable of performing at least a portion of information computing technique or process. By way of example but not limitation, processor 318 or DSP 322 may include one or more processors, controllers, microprocessors, microcontrollers, application specific integrated circuits, digital signal processors, programmable logic devices, field programmable gate arrays, central processing units, graphics processor units, or the like, or any combination thereof. Thus, at times, processor 318 or DSP 322 or any combination thereof may comprise or be representative of means for obtaining one or more observations of one or more terrestrial signals, such as to implement operation 202 of FIG. 2, at least in part. In addition, in at least one implementation, processor 318 or DSP 322 may be representative of or comprise, for example, means for storing the one or more observations in a local memory, such as to implement operation 204 of FIG. 2, at least in part. Also, at times, processor 318 or DSP 322 may comprise, for example, or be representative of means for retrieving, in response to an emergency event, the one or more stored observations for use, at least in part, in acquisition of one or more reference signals, such as illustrated in or described with respect to operation 206 of FIG. 2, for example. In addition, in some instances, processor 318 or DSP 322 may comprise, for example, or be representative of means for determining a position fix of mobile device 300 based, at least in part, on the one or more stored observations, such as to implement operation 208 of FIG. 2, at least in part.

As illustrated, DSP 322 may be coupled or connected to processor 318 and memory 320 via bus 308. Although not shown, in some instances, bus 308 may comprise one or more bus interfaces that may be integrated with one or more applicable components of mobile device 300, such as DSP 322, processor 318, memory 320, or the like. In various embodiments, one or more operations or functions described herein may be performed in response to execution of one or more machine-readable instructions stored in memory 320, such as on a computer-readable storage medium, such as RAM, ROM, FLASH, disc drive, etc., just to name a few examples. Instructions may, for example, be executable via processor 318, one or more specialized processors not shown, DSP 322, or the like. Memory 320 may comprise a non-transitory processor-readable memory, computer-readable memory, etc. that may store software code (e.g., programming code, instructions, etc.) that may be executable by processor 318, DSP 322, or the like to perform operations or functions described herein.

Mobile device 300 may comprise a user interface 324, which may include any one of several devices such as, for example, a speaker, microphone, display device, vibration device, keyboard, touch screen, etc., just to name a few examples. In at least one implementation, user interface 324 may enable a user to interact with one or more applications hosted on mobile device 300. For example, one or more devices of user interface 324 may store analog or digital signals on memory 320 to be further processed by DSP 322, processor 318, etc. in response to input or action from a user. Similarly, one or more applications hosted on mobile device 300 may store analog or digital signals in memory 320 to present an output signal to a user. In some implementations, mobile device 300 may optionally include a dedicated audio input/output (I/O) device 326 comprising, for example, a dedicated speaker, microphone, digital to analog circuitry, analog to digital circuitry, amplifiers, gain control, or the like. It should be understood, however, that this is merely an example of how audio I/O device 326 may be implemented, and that claimed subject matter is not limited in this respect. As seen, mobile device 300 may comprise one or more touch sensors 328 responsive to touching or like pressure applied on a keyboard, touch screen, or the like.

Mobile device 300 may comprise one or more sensors 334 coupled or connected to bus 308, such as, for example, one or more inertial sensors, ambient environment sensors, or the like. Inertial sensors of sensors 344 may comprise, for example, one or more accelerometers (e.g., collectively responding to acceleration of mobile device 300 in one, two, or three dimensions, etc.), gyroscopes or magnetometers (e.g., to support one or more compass or like applications, etc.), etc., just to illustrate a few examples. Ambient environment sensors of mobile device 300 may comprise, for example, one or more barometric pressure sensors, temperature sensors, ambient light detectors, camera sensors, microphones, etc., just to name few examples. Sensors 334 may generate analog or digital signals that may be stored in memory 320 and may be processed by DSP 322, processor 318, etc., such as in support of one or more applications directed to positioning or navigation operations, wireless communications, radio heat map learning, video gaming or the like.

In a particular implementation, mobile device 300 may comprise, for example, a modem processor 336, dedicated or otherwise, capable of performing baseband processing of signals received or downconverted via wireless transceiver 302, SPS receiver 312, or the like. Similarly, modem processor 336 may perform baseband processing of signals to be upconverted for transmission via wireless transceiver 302, for example. In alternative implementations, instead of having a dedicated modem processor, baseband processing may be performed, at least in part, by processor 318, DSP 322, or the like. In addition, in some instances, an interface 338, although illustrated as a separate component, may be integrated, in whole or in part, with one or more applicable components of mobile device 300, such as bus 308 or SPS receiver 312, for example. Optionally or alternatively, SPS receiver 312 may be coupled or connected to bus 308 directly. It should be understood, however, that these are merely examples of components or structures that may perform baseband processing, and that claimed subject matter is not limited in this regard.

Figure 4:
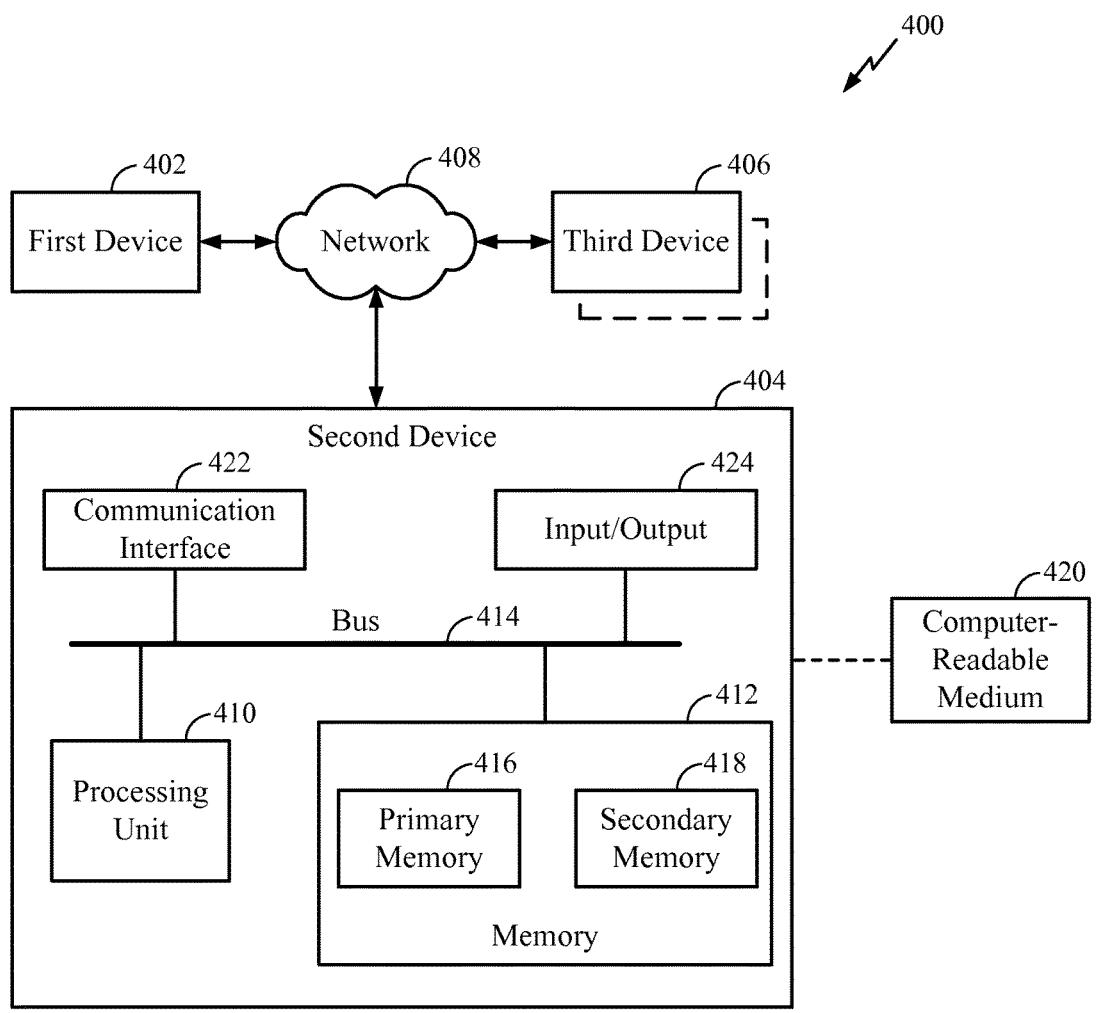
FIG. 4 is a schematic diagram illustrating an implementation of an example computing environment associated with a server.

FIG. 4 is a schematic diagram illustrating an implementation of an example computing environment or system 400 that may be associated with or include one or more servers or other devices capable of partially or substantially implementing or supporting one or more operations and/or techniques for improved E911 positioning via background signal tracking, such as discussed above in connection with FIGS. 1 and 2, for example. Computing environment 400 may include, for example, a first device 402, a second device 404, a third device 406, etc., which may be operatively coupled together via a communications network 408. In some instances, first device 402 may comprise a location server capable of providing positioning assistance parameters, such as, for example, identities, locations, etc. of known wireless transmitters, radio heat map, base station almanac, electronic digital map, database of wireless transmitters, bias estimates, signal measurements, or the like, such as discussed herein. For example, first device 402 may also comprise a server capable of providing an electronic digital map to a mobile device based, at least in part, on a coarse or rough estimate of a location of the mobile device (e.g., determined via last known SPS position fix, dead reckoning using one or more appropriate sensors, etc.), upon request, or the like. First device 402 may also comprise a server capable of providing any other suitable positioning assistance parameters (e.g., a radio heat map, etc.) relevant to a location of a mobile device. Second device 404 or third device 406 may comprise, for example, mobile devices, though claimed subject matter is not so limited. For example, in some instances, second device 404 may comprise a server functionally or structurally similar to first device 402, just to illustrate another possible implementation. In addition, communications network 408 may comprise, for example, one or more wireless transmitters, such as cellular base stations, Wi-Fi access points, femtocells, or the like. Of course, claimed subject matter is not limited in scope in these respects.

First device 402, second device 404, or third device 406 may be representative of any device, appliance, platform, or machine that may be capable of exchanging parameters and/or information over communications network 408. By way of example but not limitation, any of first device 402, second device 404, or third device 406 may include: one or more computing devices or platforms, such as, for example, a desktop computer, a laptop computer, a workstation, a server device, or the like; one or more personal computing or communication devices or appliances, such as, for example, a personal digital assistant, mobile communication device, or the like; a computing system or associated service provider capability, such as, for example, a database or information storage service provider/system, a network service provider/system, an Internet or intranet service provider/system, a portal or search engine service provider/system, a wireless communication service provider/system; or any combination thereof. Any of first, second, or third devices 402, 404, and 406, respectively, may comprise one or more of a mobile device, wireless transmitter or receiver, server, etc. in accordance with example implementations described herein.

In an implementation, communications network 408 may be representative of one or more communication links, processes, or resources capable of supporting an exchange of information between at least two of first device 402, second device 404, or third device 406. By way of example but not limitation, communications network 408 may include wireless or wired communication links, telephone or telecommunications systems, information buses or channels, optical fibers, terrestrial or space vehicle resources, local area networks, wide area networks, intranets, the Internet, routers or switches, and the like, or any combination thereof. As illustrated, for example, via a dashed lined box partially obscured by third device 406, there may be additional like devices operatively coupled to communications network 408. It is also recognized that all or part of various devices or networks shown in computing environment 400, or processes or methods, as described herein, may be implemented using or otherwise including hardware, firmware, software, or any combination thereof.

By way of example but not limitation, second device 404 may include at least one processing unit 410 that may be operatively coupled to a memory 412 via a bus 414. Processing unit 410 may be representative of one or more circuits capable of performing at least a portion of a suitable computing procedure or process. For example, processing unit 410 may include one or more processors, controllers, microprocessors, microcontrollers, application specific integrated circuits, digital signal processors, programmable logic devices, field programmable gate arrays, or the like, or any combination thereof. Although not shown, second device 404 may include a location-tracking unit that may initiate a position fix of a suitable mobile device, such as in an area of interest, for example, based, at least in part, on one or more received or acquired wireless signals, such as from an SPS, one or more cellular base stations, Wi-Fi access points, etc. In some implementations, a location-tracking unit may be at least partially integrated with a suitable processing unit, such as processing unit 410, for example, though claimed subject matter is not so limited. In certain server-based or server-supported implementations, processing unit 410 may, for example, comprise means for obtaining one or more observations of one or more terrestrial signals; means for storing the one or more observations in a local memory; means for retrieving, in response to an emergency event, the one or more stored observations for use, at least in part, in acquisition of one or more reference signals; and means for determining a position fix of a mobile device based, at least in part, on the one or more stored observations, such as to facilitate or support operations 202, 204, 206, and/or 208 of FIG. 2, at least in part. In some instances, processing unit 410 may, for example, comprise means for narrowing a search window for the acquisition of the one or more reference signals, such as to facilitate or support operations 202, 204, 206, and/or 208 of FIG. 2, at least in part. Depending on an implementation, processing unit 410 may also comprise, for example, means for detecting expected multipath and/or true EAP for the acquisition of the one or more reference signals, such as to facilitate or support operations 202, 204, 206, and/or 208 of FIG. 2, at least in part.

Memory 412 may be representative of any information storage mechanism or appliance. Memory 412 may include, for example, a primary memory 416 and a secondary memory 418. Primary memory 416 may include, for example, a random access memory, read only memory, etc. While illustrated in this example as being separate from processing unit 410, it should be understood that all or part of primary memory 416 may be provided within or otherwise co-located/coupled with processing unit 410. Secondary memory 418 may include, for example, same or similar type of memory as primary memory or one or more information storage devices or systems, such as, for example, a disk drive, an optical disc drive, a tape drive, a solid state memory drive, etc. In certain implementations, secondary memory 418 may be operatively receptive of, or otherwise configurable to couple to, a computer-readable medium 420. Computer-readable medium 420 may include, for example, any non-transitory storage medium that may carry or make accessible information, code, or instructions for one or more of devices in computing environment 400. Computer-readable medium 420 may also be referred to as a machine-readable medium, storage medium, or the like.

Second device 404 may include, for example, a communication interface 422 that may provide for or otherwise support an operative coupling of second device 404 to at least communications network 408. By way of example but not limitation, communication interface 422 may include a network interface device or card, a modem, a router, a switch, a transceiver, and the like. Second device 404 may also include, for example, an input/output device 424. Input/output device 424 may be representative of one or more devices or features that may be configurable to accept or otherwise introduce human or machine inputs, or one or more devices or features that may be capable of delivering or otherwise providing for human or machine outputs. By way of example but not limitation, input/output device 424 may include an operatively configured display, speaker, keyboard, mouse, trackball, touch screen, information port, or the like.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units de-signed to perform the functions described herein, or combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, messages, parameters, frames, packets, content and/or the like. It should be understood, however, that all of these and/or similar terms are to be associated with appropriate physical quantities or manifestations, and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. Likewise, operation of a memory device to store bits, values, elements, symbols, characters, terms, numbers, numerals, measurements, messages, parameters, frames, packets, content and/or the like may comprise a physical transformation. With particular types of memory devices, such a physical transformation may comprise a physical transformation of an article to a different state or thing. For example, but without limitation, for some types of memory devices, a change in state may involve an accumulation and/or storage of charge or a re-lease of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") net-work, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method for background signal tracking at a mobile device comprising:
   obtaining, via decoding one or more signal parameters with a processor, one or more observations of one or more terrestrial signals;
   storing the one or more observations in a local memory of the mobile device;
   retrieving, via accessing the local memory of the mobile device and in response to an emergency event, the one or more stored observations for use, at least in part, in narrowing the size of a search window of an expected uncertainty parameter for acquisition of one or more reference signals, the expected uncertainty parameter being provided in a message received at the mobile device and indicative of the emergency event; and
   computing, via the processor, a position fix of the mobile device based, at least in part, on the one or more retrieved observations.

2. The method of claim 1, wherein the one or more stored observations comprise at least one of the following: a measured time of arrival (TOA) of the one or more terrestrial signals; a measured time difference of arrival (TDOA) of the one or more terrestrial signals; an identity of a terrestrial transmitter transmitting the one or more terrestrial signals; or any combination thereof.

3. The method of claim 1, wherein the emergency event is detected via the message received at the mobile device and indicative of the emergency event.

4. The method of claim 1, and further comprising narrowing the search window for the acquisition of the one or more reference signals.

5. The method of claim 1, wherein the message received at the mobile device and indicative of the emergency event comprises an LTE positioning protocol message communicated in response to a detection of the emergency event at a Public Safety Answering Point (PSAP).

6. The method of claim 1, and further comprising detecting a true Early Arrival Path (EAP) for the acquisition of the one or more reference signals.

7. The method of claim 1, wherein the one or more terrestrial signals comprise at least one of the following: one or more positioning reference signals (PRS) in Long Term Evolution (LTE); one or more cell-specific reference signals (CRS) signals in Long Term Evolution (LTE); one or more 1× signals for in Code Division Multiple Access (CDMA); one or more satellite positioning system (SPS) signals; one or more wireless wide area network (WWAN) signals; or any combination thereof.

8. The method of claim 1, wherein the one or more observations are obtained independently from the emergency event.

9. The method of claim 1, and further comprising augmenting the one or more observations with sensor data for use, at least in part, in acquisition of the one or more reference signals.

10. The method of claim 1, wherein the one or more reference signals are acquired via at least one of the following: an observed time difference of arrival (OTDOA) positioning technique; an Advanced Forward Link Trilateration (AFLT) positioning technique; an SPS positioning technique; or any combination thereof.

11. The method of claim 1, wherein the emergency event comprises a 911 call originating from the mobile device.

12. The method of claim 1, wherein the acquisition of the one or more reference signals comprises at least acquisition of: one or more measurements of TOA of the one or more reference signals or one or more measurements of TDOA of the one or more reference signals.

13. The method of claim 1, and further comprising filtering one or more measurements of TOA or TDOA of one or more reference signals subsequent to the message received at the mobile device and indicative of the emergency event.

14. The method of claim 1, wherein the one or more reference signals are acquired in a Global Navigation Satellite Systems (GNSS)-denied environment.

15. The method of claim 1, and further comprising detecting expected multipath for the acquisition of the one or more reference signals.

16. An apparatus for background signal tracking comprising:

means for obtaining, via decoding one or more signal parameters with a processor, one or more observations of one or more terrestrial signals;

means for storing the one or more observations in a local memory of the mobile device;

means for retrieving, via accessing the local memory of the mobile device and in response to an emergency event, the one or more stored observations for use, at least in part, in narrowing the size of a search window of an expected uncertainty parameter for acquisition of one or more reference signals, the expected uncertainty parameter being provided in a message received at the mobile device and indicative of the emergency event; and means for computing, via the processor, a position fix of a mobile device based, at least in part, on the one or more retrieved observations.

17. The apparatus of claim 16, and further comprising means for narrowing the search window for the acquisition of the one or more reference signals.

18. The apparatus of claim 16, and further comprising means for detecting a true Early Arrival Path (EAP) for the acquisition of the one or more reference signals.

19. An apparatus for background signal tracking comprising:
a wireless transceiver to communicate with an electronic communications network, the wireless transceiver configured to:
obtain, via decoding one or more signal parameters with one or more processors, one or more observations of one or more terrestrial signals; and
the one or more processors coupled to a memory and to the wireless transceiver, the one or more processors configured to:
store the one or more observations in a local memory of the mobile device;
retrieve, via accessing the local memory of the mobile device and in response to an emergency event, the one or more stored observations for use, at least in part, in narrowing the size of a search window of an expected uncertainty parameter for acquisition of one or more reference signals, the expected uncertainty parameter being provided in a message received at the mobile device and indicative of the emergency event; and
compute, via the one or more processors, a position fix of a mobile device based, at least in part, on the one or more retrieved observations.

20. The apparatus of claim 19, wherein the one or more stored observations comprise at least one of the following: a measured time of arrival (TOA) of the one or more terrestrial signals; a measured time difference of arrival (TDOA) of the one or more terrestrial signals; an identity of a terrestrial transmitter transmitting the one or more terrestrial signals; or any combination thereof.

21. The apparatus of claim 19, wherein the one or more processors further to narrow the search window for the acquisition of the one or more reference signals.

22. The apparatus of claim 19, wherein the one or more processors further to detect a true Early Arrival Path (EAP) for the acquisition of the one or more reference signals.

23. The apparatus of claim 19, wherein the emergency event is detected via the message received at the mobile device.

24. The apparatus of claim 19, wherein the one or more terrestrial signals to comprise at least one of the following: one or more positioning reference signals (PRS) in Long Term Evolution (LTE); one or more cell-specific reference signals (CRS) signals in Long Term Evolution (LTE); one or more 1× signals for in Code Division Multiple Access (CDMA); one or more satellite positioning system (SPS) signals; one or more wireless wide area network (WWAN) signals; or any combination thereof.

25. The apparatus of claim 19, wherein the one or more reference signals are to be acquired via at least one of the following: an observed time difference of arrival (OTDOA) positioning technique; an Advanced Forward Link Trilateration (AFLT) positioning technique; an SPS positioning technique; or any combination thereof.

26. The apparatus of claim 19, wherein the one or more observations are to be obtained independently from the emergency event.

27. The apparatus of claim 19, wherein the one or more processors further to filter one or more measurements of TOA or TDOA of one or more reference signals subsequent to the emergency event.

28. A non-transitory storage medium having instructions executable by a processor to:
obtain, via decoding one or more signal parameters with the processor, one or more observations of one or more terrestrial signals;
store the one or more observations in a local memory of the mobile device;
retrieve, via accessing the local memory of the mobile device and in response to an emergency event, the one or more stored observations for use, at least in part, in narrowing the size of a search window of an expected uncertainty parameter for acquisition of one or more reference signals, the expected uncertainty parameter being provided in a message received at the mobile device and indicative of the emergency event; and
compute, via the processor, a position fix of a mobile device based, at least in part, on the one or more retrieved observations.

* * * * *